United States Patent
Chien et al.

(10) Patent No.: US 10,382,791 B2
(45) Date of Patent: Aug. 13, 2019

(54) DATA STRUCTURE FOR VIDEO CODING UNIT

(71) Applicant: QUALCOMM Incorporated, San Diego, CA (US)

(72) Inventors: Wei-Jung Chien, San Diego, CA (US); Chengjie Tu, San Diego, CA (US); Xianglin Wang, San Diego, CA (US); Muhammed Zeyd Coban, Carlsbad, CA (US)

(73) Assignee: Qualcomm Incorporated, San Diego, CA (US)

( * ) Notice: Subject to any disclaimer, the term of this patent is extended or adjusted under 35 U.S.C. 154(b) by 151 days.

(21) Appl. No.: 14/724,108

(22) Filed: May 28, 2015

(65) Prior Publication Data
US 2016/0261868 A1    Sep. 8, 2016

Related U.S. Application Data

(60) Provisional application No. 62/129,290, filed on Mar. 6, 2015.

(51) Int. Cl.
*H04N 19/52* (2014.01)
*H04N 19/70* (2014.01)
(Continued)

(52) U.S. Cl.
CPC ........... *H04N 19/70* (2014.11); *H04N 19/423* (2014.11); *H04N 19/463* (2014.11); *H04N 19/593* (2014.11); *H04N 19/52* (2014.11)

(58) Field of Classification Search
USPC .................................................. 375/240.02
See application file for complete search history.

(56) References Cited

U.S. PATENT DOCUMENTS

| 2011/0103701 A1 | 5/2011 | Cheon |
| 2012/0106652 A1 | 5/2012 | Huang et al. |

(Continued)

OTHER PUBLICATIONS

Sullivan et al.( G. J. Sullivan, J. R. Ohm, W. J. Han and T. Wiegand, "Overview of the High Efficiency Video Coding (HEVC) Standard," in IEEE Transactions on Circuits and Systems for Video Technology, vol. 22, No. 12, pp. 1649-1668, Dec. 2012.).*

(Continued)

*Primary Examiner* — Behrooz M Senfi
*Assistant Examiner* — Ana Picon-Feliciano
(74) *Attorney, Agent, or Firm* — Procopio, Cory, Hargreaves & Savitch LLP

(57) ABSTRACT

The disclosure provides a system and methods for encoding video data. The method can include storing a data structure in a memory, the data structure having a first plurality of data elements arranged corresponding to a second plurality of data elements of a first video data block, and defining a periphery, the data structure further including data related to all of a smallest prediction unit (PU) for the first video data block. The method can also include increasing a size of the data structure in the memory by adding a plurality of extended units along the periphery of the first plurality of data elements, each extended unit having data related to a smallest data element of the first video data block, the extended units being set to default values. The method can also comprise encoding the first video data block based on the data structure.

34 Claims, 9 Drawing Sheets

(51) Int. Cl.
*H04N 19/423* (2014.01)
*H04N 19/463* (2014.01)
*H04N 19/593* (2014.01)

(56) References Cited

U.S. PATENT DOCUMENTS

| | | |
|---|---|---|
| 2012/0314767 A1 | 12/2012 | Wang et al. |
| 2013/0083853 A1 | 4/2013 | Coban et al. |
| 2013/0315571 A1* | 11/2013 | Park ........................ H04N 19/52 386/329 |
| 2015/0010087 A1* | 1/2015 | Funnell .................. H04N 19/96 375/240.24 |
| 2015/0023406 A1 | 1/2015 | Lee et al. |
| 2015/0215631 A1* | 7/2015 | Zhou ................... H04N 19/436 375/240.02 |

OTHER PUBLICATIONS

International Search Report and Written Opinion—PCT/US2016/012064—ISA/EPO—Apr. 12, 2016.
G.J. Sullivan et al., "Overview of the High Efficiency Video Coding (HEVC) Standard", IEEE Transactions on Circuits and Systems for Video Technology, Jan. 1, 2012 (Jan. 1, 2012), pp. 1-19, XP055045358, ISSN: 1051-8215, DOI: 10.1109/TCSVT.2012.2221191.

\* cited by examiner

DATA STRUCTURE FOR VIDEO CODING UNIT

This application claims priority to U.S. Provisional Application No. 62/129,290, filed Mar. 6, 2015, entitled "Data Structure for Video Coding Unit," the contents of which are hereby incorporated by reference in their entirety.

BACKGROUND

Technological Field

This disclosure is related to the field of video coding and compression. In particular, it is related to adaptive tile sizing for High Efficiency Video Coding (HEVC). It is also related to 3D video coding, such as the multiview extension of HEVC, referred to as MV-HEVC.

Background

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding processes, such as those described in the standards defined by MPEG-2, MPEG-4, ITU-T H.263, ITU-T H.264/MPEG-4, Part 10, Advanced Video Coding (AVC), the (HEVC standard presently under development, and extensions of such standards. The video devices may transmit, receive, encode, decode, and/or store digital video information more efficiently by implementing such types of video coding.

Video coding methods include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes systems and methods related to video coding. The systems, methods, and devices of this disclosure each have several innovative aspects, no single one of which is solely responsible for the desirable attributes disclosed herein.

One aspect of the disclosure provides a method of encoding video data. The method can include storing a data structure in a memory. The data structure can have a first plurality of data elements arranged corresponding to a second plurality of data elements of a first portion of a picture, and defining a periphery, the data structure further including data related to all of a smallest prediction unit (PU) for the first portion of a picture. The method can further include increasing a size of the data structure in the memory comprising adding a plurality of extended units along the periphery of the first plurality of data elements, each extended unit of the plurality of extended units having data related to a smallest data element of the first portion of a picture. The method can further include setting each extended unit of the plurality of extended units and the first plurality of data elements to default values. The method can further include encoding the first portion of a picture based on the data structure.

Another aspect of the disclosure provides a device for encoding video data. The device can have a memory configured to store a data structure having a first plurality of data elements arranged corresponding to a second plurality of data elements of a first portion of a picture, and defining a periphery, the data structure further including data related to all of a smallest prediction units (PU) for the first portion of a picture. The device can also have a processor operably coupled to the memory. The processor can increase the size of the data structure in the memory, comprising adding a plurality of extended units along the periphery of the first plurality of data elements, each extended unit of the plurality of extended units having data related to a smallest data element of the first portion of a picture. The processor can also set each extended unit of the plurality of extended units and the first plurality of data elements to default values. The processor can also encode the first portion of a picture based on the data structure.

Another aspect of the disclosure provides a method of encoding video data in a video data block. The method can include storing data related to each prediction unit of a first plurality of prediction units in a data structure, the data structure having a size of a coding tree unit (CTU). The method can also include storing extended data for each extended unit of a plurality of extended units disposed along the periphery of the plurality of prediction units in the data structure. The method can also include encoding a first CTU based on the data structure. The method can also include updating a left-most column of the plurality of extended units in the data structure with data related to a right-most column of prediction units of the first CTU to form a first updated data structure. The method can also include encoding a second CTU based on the first updated data structure.

Another aspect of the disclosure provides a device for encoding video data. The device can have a memory. The memory can store a data structure, the data structure having data related to each prediction unit of a first plurality of prediction units, the data structure further having a size of a coding tree unit (CTU). The memory can also store extended data for each extended unit of a plurality of extended units disposed along the periphery of the plurality of prediction units in the data structure. The device can also have a processor operably coupled to the memory. The processor can encode a first CTU based on the data structure. The processor can also update a left-most column of the plurality of extended units in the data structure with data related to a right-most column of prediction units of the first CTU to form a first updated data structure. The processor can also encode a second CTU based on the first updated data structure.

Other features and advantages of the present disclosure should be apparent from the following description which illustrates, by way of example, aspects of the disclosure.

DESCRIPTION OF THE DRAWINGS

The details of embodiments of the present disclosure, both as to their structure and operation, may be gleaned in part by study of the accompanying drawings, in which like reference numerals refer to like parts, and in which.

DETAILED DESCRIPTION

Figure 1:
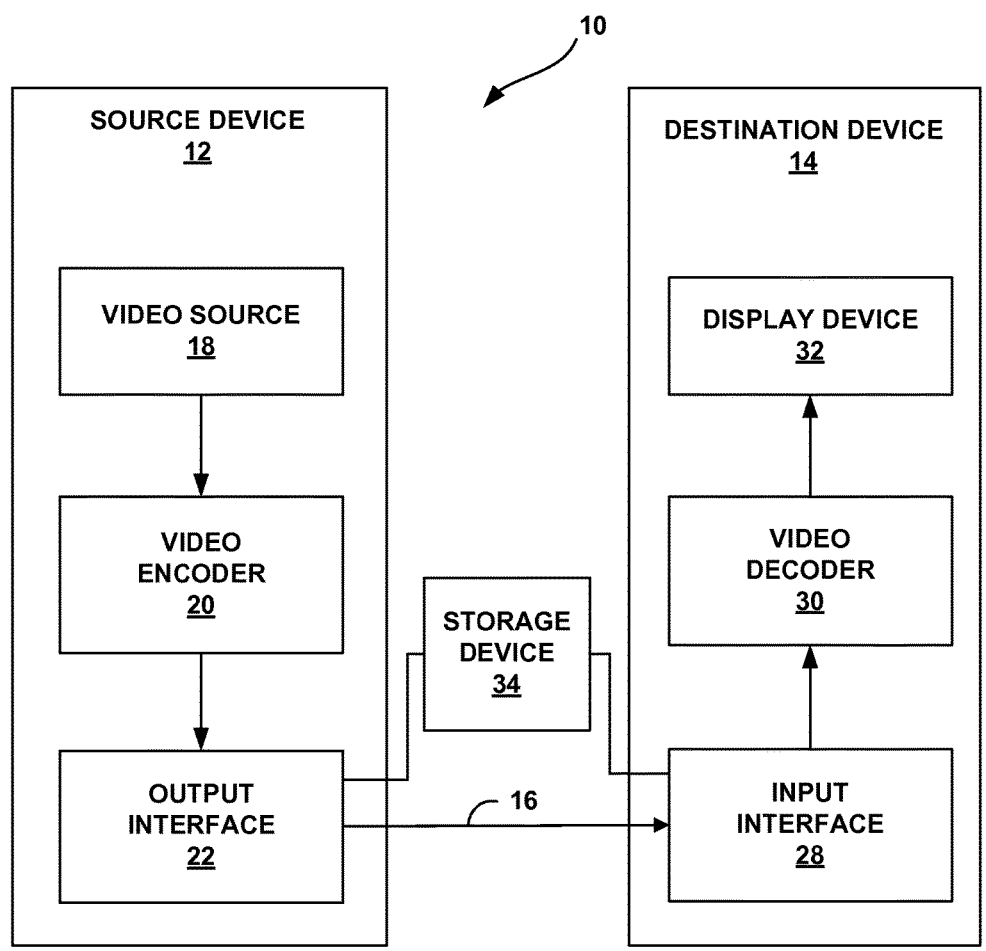
FIG. 1 is a block diagram of a video coding system.

This application is related to spatial prediction in video coding. In coding successive blocks or frames of video data, video encoders can exploit neighboring pixel information to describe, for example, pixel motion in terms of a vector. This can dramatically reduce the amount of information required to describe pixel motion in a series of video frames or blocks. In some instances this principle can be applied to pixel signaling and prediction mode signaling. However, not all pixels are always available for use as a reference during coding. Accordingly, there are multiple restrictions placed on the availability of a pixel or block as such a spatial reference, for example. As encoding proceeds, these restrictions must be checked in order to verify the availability (or unavailability) of neighboring video data. In order to reduce the processing overhead required for such "unavailability" checks, certain default data can be implemented to provide a reference for the coding process, thereby circumventing at least a portion of the checks. These default data can be implemented as temporarily stored and continuously or periodically updated data structures that are referenced throughout the encoding process to alleviate the need to conduct the unavailability checks. This can lead to an increase in coding efficiency.

The detailed description set forth below, in connection with the accompanying drawings, is intended as a description of various embodiments and is not intended to represent the only embodiments in which the disclosure may be practiced. The detailed description includes specific details for the purpose of providing a thorough understanding of the embodiments. However, it will be apparent to those skilled in the art that the disclosure without these specific details. In some instances, well-known structures and components are shown in simplified form for brevity of description.

Video Coding

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions. One or more of the foregoing standards may be used with the embodiments described herein.

In addition, a new video coding standard, namely High Efficiency Video Coding (HEVC), has been developed by the Joint Collaboration Team on Video Coding (JCT-VC) of ITU-T Video Coding Experts Group (VCEG) and ISO/IEC Motion Picture Experts Group (MPEG). The latest HEVC draft specification, and referred to as "HEVC WD" hereinafter, is available from http://phenix.int-evey.fr/jct/doc_en-d_user/documents/15_Geneva/wg11/JCTVC-O1003-v1.zip. The multi-view extension to HEVC, namely MV-HEVC, and another HEVC extension for more advanced 3D video coding (3D-HEVC) are being developed by the JCT-3V, and meanwhile, the scalable video coding extension to HEVC, namely SHVC, is being developed by the JCT-VC. A recent Working Draft (WD) of MV-HEVC, referred to as MV-HEVC WD5 hereinafter, is available from http://phenix.it-sudparis.eu/jct2/doc_end_user/documents/6_Geneva/wg11/JCT3V-F1004-v6.zip. The latest WD of 3D-HEVC, referred to as 3D-HEVC WD1 hereinafter, is available from http://phenix.it-sudparis.eu/jct2/doc_en-d_user/documents/6_Geneva/wg11/JCT3V-F1001-v3.zip. A recent Working Draft (WD) of SHVC and referred to as SHVC WD3 hereinafter, is available from http://phenix.it-sudparis.eu/jct/doc_end_user/documents/15_Geneva/wg11/JCTVC-O1008-v3.zip.

HEVC can generally reduce bitrate requirements by half with comparable image quality, at the expense of increased computational complexity. In some embodiments, HEVC encoders can trade off computational complexity, compression rate, robustness to errors, and encoding delay time. Accordingly, HEVC can generally support higher resolution video and improved parallel processing methods.

The HEVC video coding layer uses a "hybrid" approach, implementing inter-picture and intra-picture prediction and two dimensional (2D) transform coding. An HEVC encoder can first split a picture into block shaped regions for the first picture, or the first picture of a random access point, which uses intra-picture prediction. Intra-picture prediction as used herein can generally refer to the prediction of the blocks in the picture based only on the information in that picture. For all other pictures, inter-picture prediction is used. Inter-picture prediction can generally refer to when prediction information is used from other pictures to generate the current picture. After the prediction methods are finished and the picture goes through the loop filters, the final picture representation is stored in the decoded picture buffer. Pictures stored in the decoded picture buffer can be used for the prediction of other pictures.

HEVC can also implement several parallel processing tools. In some embodiments, tiles can be used to divide a picture into a grid of rectangular regions that can independently be encoded and decoded.

The HEVC standard employs the parameter set concept. The sequence parameter set (SPS), picture parameter set (PPS), and video parameter set (VPS) mechanism in HEVC may decouple the transmission of infrequently changing information from the transmission of coded video block data.

In HEVC, an identifier of SPS picture, PPS, or VPS is coded using the variable-length encoding coding method named 'ue(v)'. The HEVC working draft defines 'ue(v)' coded syntax elements as unsigned integer Exp-Golomb-coded syntax elements with the left bit first. Each SPS includes an SPS identifier (ID), each PPS includes a PPS ID and an SPS ID, and each slice header includes a PPS ID. Each buffering period supplemental enhancement information (SEI) message also includes an SPS ID. In general, a video coding device or a video processing device may encapsulate data of a bitstream within network abstraction layer (NAL) units. NAL units include video coding layer (VCL) NAL units and non-VCL NAL units. VCL NAL units generally include information used by a video coder, such as coded video data and parameter sets, e.g., SPSs, PPSs, and VPSs. Non-VCL NAL units include information defining SEI messages, which may contain information that is not necessary for decoding the coded pictures samples from VCL NAL units, but may assist in processes related to decoding, display, error resilience, and other purposes.

Video Coding System

FIG. 1 is a block diagram of a video coding system. A video coding system ("system") 10 that may utilize methods in accordance with aspects described in this disclosure. As used described herein, the term "video coder" refers generically to both video encoders and video decoders. In this disclosure, the terms "video coding" or "coding" may refer generically to video encoding and video decoding.

As shown in FIG. 1, system 10 includes a source device 12 that can generate encoded video data to be decoded at a later time by a destination device 14. The source device 12 and the destination device 14 can comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

The destination device 14 may receive the encoded video data to be decoded via a link 16. The link 16 may comprise any type of medium or device capable of moving the encoded video data from the source device 12 to the destination device 14. In one example, the link 16 may comprise a communication medium to enable source device 12 to transmit encoded video data directly to the destination device 14 in real-time. The source device 12 may modulate the encoded video data according to a communication standard, such as a wireless communication protocol, and transmitted to the destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

Encoded data can be output from the output interface 22 to a storage device 34. Similarly, the input interface 28 can access encoded data stored in the storage device 34. The storage device 34 can include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device 34 can correspond to a file server or another intermediate storage device that can hold the encoded video generated by the source device 12. The destination device 14 can access stored video data from the storage device 34 via streaming or download. The file server can be any type of server capable of storing encoded video data and transmitting that encoded video data to the destination device 14. Example file servers include a web server (e.g., for a website), an FTP server, network attached storage (NAS) devices, or a local disk drive. The destination device 14 can access the encoded video data through any standard data connection, including an Internet connection. This can include a wireless channel (e.g., a Wi-Fi connection), a wired connection (e.g., DSL, cable modem, etc.), or a combination of both that is suitable for accessing encoded video data stored on a file server. The transmission of encoded video data from the storage device 34 can be a streaming transmission, a download transmission, or a combination of both.

The methods of this disclosure are not necessarily limited to wireless applications or settings. The methods may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 can be configured to support one-way or two-way video transmission to support applications such as video streaming, video playback, video broadcasting, and/or video telephony.

In the example of FIG. 1, the source device 12 includes a video source 18, video encoder 20, and an output interface 22. In some cases, the output interface 22 may include a modulator/demodulator (modem) and/or a transmitter. In the source device 12, the video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, the source device 12 and destination the device 14 may form so-called camera phones or video phones. However, the methods described in this disclosure may be applicable to video coding in general, and may be applied to wireless and/or wired applications.

The video encoder 20 may encode the captured, pre-captured, or computer-generated video. In some examples, output interface 22 of the source device 12 can transmit the encoded video data directly to the destination device 14 via. The encoded video data may also (or alternatively) be stored onto the storage device 34 for later access by the destination device 14 or other devices, for decoding and/or playback.

The destination device 14 includes an input interface 28, a video decoder 30, and a display device 32. In some cases, the input interface 28 may include a receiver and/or a modem. The input interface 28 of the destination device 14 receives the encoded video data over the link 16. The encoded video data communicated over the link 16, or provided on the storage device 34, can include a variety of syntax elements generated by the video encoder 20 for use by a video decoder, such as the video decoder 30, in decoding the video data. Such syntax elements can be included with the encoded video data transmitted on a communication medium, stored on a storage medium, or stored a file server.

The display device 32 can be integrated with, or external to, the destination device 14. In some examples, the destination device 14 can include an integrated display device and be configured to interface with an external display device. In other examples, the destination device 14 can be a display device. In general, the display device 32 displays the decoded video data to a user, and may comprise any of a variety of display devices such as a liquid crystal display (LCD), a plasma display, an organic light emitting diode (OLED) display, or another type of display device.

The video encoder 20 and the video decoder 30 each can be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the methods are implemented partially in software, a device may store instructions for the software in a suitable, non-transitory computer-readable medium and execute the instructions in hardware using one or more processors to perform the methods of this disclosure. Each of the video encoder 20 and the video decoder 30 may be included in one or more encoders or decoders, either of which may be integrated as part of a combined encoder/decoder (CODEC) in a respective device.

The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. An LCU can also be referred to herein as a coding tree unit (CTU). A CTU is the basic unit of HEVC. A treeblock is conceptually similar to a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In general, a TU is used for the transform and quantization processes. A given CU having one or more PUs may also include one or more transform units (TUs). Following prediction, the video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a treeblock, i.e., CTU, LCU, or a CU, which includes a coding node and PUs and TUs.

A video sequence can include a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. The video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up," "Down," "Left," or "Right." Thus, for example, "2NxnU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, the video encoder 20 may calculate residual data for the TUs of the CU. The PUs can include pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. The video encoder 20 can form the TUs including the residual data for the CU, and then transform the TUs to produce transform coefficients for the CU.

Following any transforms to produce transform coefficients, the video encoder 20 can perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients.

In some examples, the video encoder 20 can utilize a predefined scan order to scan the quantized transform coefficients to produce a serialized vector that can be entropy encoded. In other examples, the video encoder 20 can perform an adaptive scan. After scanning the quantized transform coefficients to form a one-dimensional vector, the video encoder 20 can entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. The video encoder 20 may also entropy encode syntax elements associated with the encoded video data for use by the video decoder 30 in decoding the video data.

To perform CABAC, the video encoder 20 can assign a context within a context model to a symbol to be transmitted. The context may relate to, for example, whether neighboring values of the symbol are non-zero or not. To perform CAVLC, the video encoder 20 may select a variable length code for a symbol to be transmitted. Codewords in VLC can be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination can be based on a context assigned to the symbol.

Figure 2:
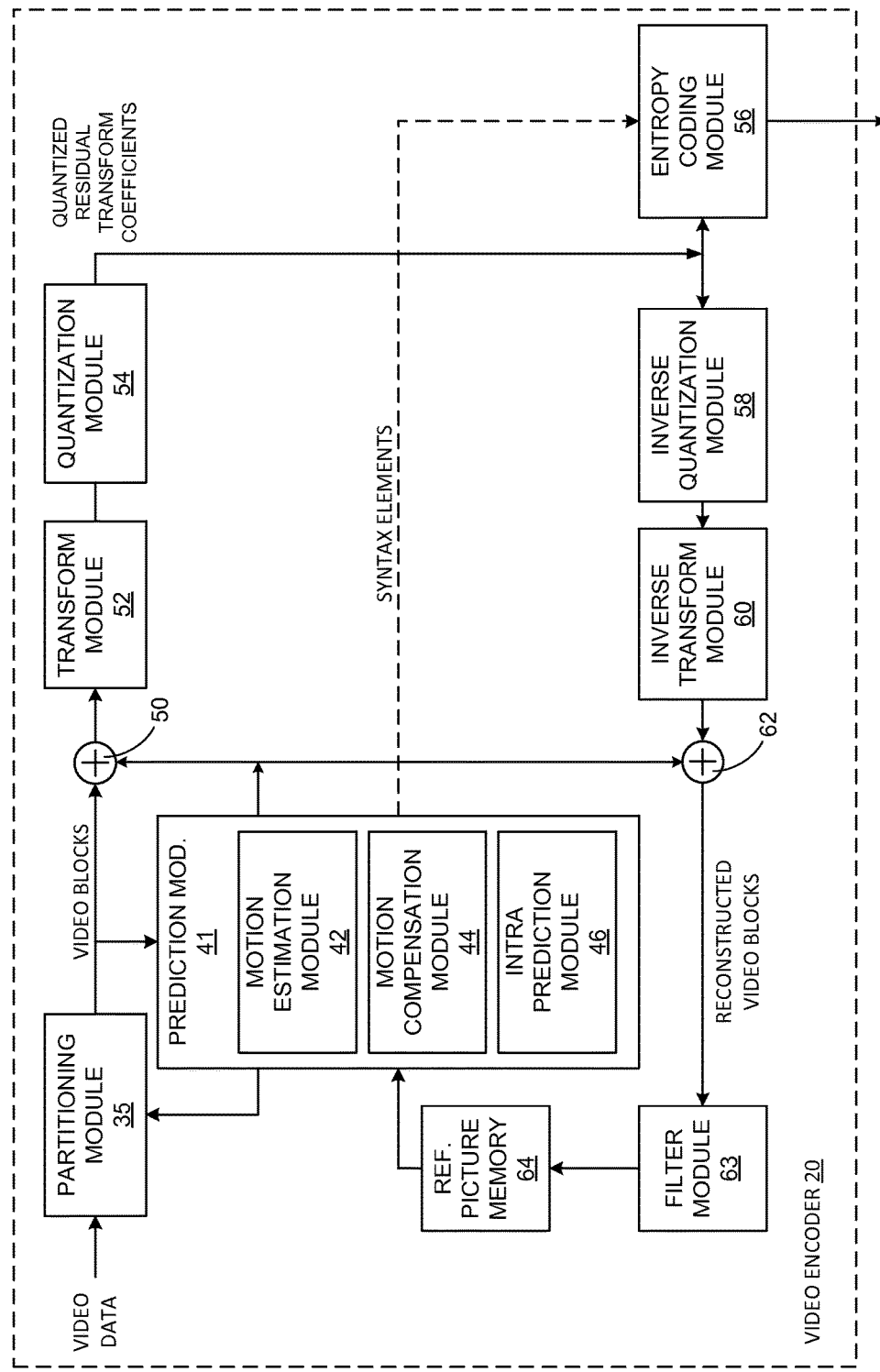
FIG. 2 is a block diagram of the video encoder of FIG. 1.

FIG. 2 is a functional block diagram of the video encoder of FIG. 1. The video encoder 20 can include a partitioning module 35 configured to receive captured video data and partition the video data into video blocks. The partitioning module 35 can partition the video data into slices, tiles, or other larger units. The partitioning module 35 can also partition video blocks, e.g., according to a quadtree structure of LCUs and CUs. The video encoder 20 may divide the slice into multiple video blocks (and possibly into sets of video blocks referred to as tiles).

The video encoder 20 can also have a prediction module 41 operably coupled to the partitioning module 35 and configured to receive the partitioned video data. The prediction module 41 can select one of a plurality of possible coding modes, such as one of a plurality of intra coding modes or one of a plurality of inter coding modes, for the current video block based on error results (e.g., coding rate and the level of distortion). The prediction module 41 can enable the video encoder 20 to perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes. The prediction module 41 can perform the inter-prediction and intra-prediction within certain restrictions, as described below.

The prediction module 41 can include a motion estimation module 42, a motion compensation module 44, and an intra-prediction module 46. Each of these components can be operably connected or integrated in one or more processors within the video encoder 20. While discussed separately for conceptual purposes, the motion estimation module 42, the motion compensation module 44, and the intra-prediction module 46 can be highly integrated.

The motion estimation module 42 can be configured to determine the inter-prediction mode for a video slice according to a predetermined pattern for a video sequence. Such inter-prediction or inter-predictive coding of the current video block relative to one or more predictive blocks in one or more reference pictures can provide temporal compression. The predetermined pattern may designate video slices in the sequence as P slices, B slices or GPB slices. Motion estimation, as used herein, may generally refer to the process of generating motion vectors, which estimate motion for video blocks. A motion vector, for example, may indicate the displacement of a PU of a video block within a current video frame or picture relative to a predictive block within a reference frame or reference picture. The reference frames can be stored in a reference picture memory 64 operably coupled to the prediction module 41.

In some embodiments, the motion vector can have sub-integer pixel ("sub-pel") precision. For example, both a horizontal component and a vertical component of the motion vector may have respective full integer, or full-pel, components and sub-pel components. Such sub-pel precision can be interpolated from full-pel positions within the reference frame. As such, the terms fractional pixel, fractional pel, sub-integer, and sub-pixel motion estimation may be used interchangeably. In some embodiments interpolation filters can provide the interpolated positions. The interpolation filters can be invoked by one or both of motion estimation module 42 and motion compensation module 44 to perform interpolation as part of motion estimation and/or motion compensation.

A predictive block is a block that is found to closely match the PU of the video block to be coded in terms of pixel difference, which may be determined by sum of absolute difference (SAD), sum of square difference (SSD), or other difference metrics. In some examples, the motion prediction module ("prediction module") 41 can calculate values for sub-integer pixel positions of reference pictures stored in the reference picture memory 64. For example, the prediction module 41 can interpolate values of one-quarter pixel positions, one-eighth pixel positions, or other fractional pixel positions of the reference picture. Therefore, the motion estimation module 42 may perform a motion search relative to the full pixel positions and fractional pixel positions and output a motion vector with fractional pixel precision.

The motion estimation module 42 can calculate a motion vector for a PU of a video block in an inter-coded slice by comparing the position of the PU to the position of a predictive block of a reference picture. The reference picture can be selected from a first reference picture list (List 0) or a second reference picture list (List 1), each of which identify one or more reference pictures stored in the reference picture memory 64. The motion estimation module 42 can send the calculated motion vector to the motion compensation module 44 and an entropy encoding module 56.

Motion compensation can involve fetching or generating the predictive block based on the motion vector determined by motion estimation. This can include interpolations to sub-pixel precision. Upon receiving the motion vector for the PU of the current video block, the motion compensation module 44 can locate the predictive block to which the motion vector points in one of the reference picture lists. The motion compensation module 44 can also generate syntax elements associated with the video blocks and the video slice for use by the video decoder 30 in decoding the video blocks of the video slice.

The intra-prediction module 46 within the prediction module 41 can perform intra-predictive coding of the current video block relative to one or more neighboring blocks in the same frame or slice to provide spatial compression. The intra-prediction module 46 can intra-predict a current block, as an alternative to the inter-prediction performed by the motion estimation module 42 and the motion compensation module 44, as described above. In particular, intra-prediction module 46 may determine an intra-prediction mode to use to encode a current block. In some examples, the intra-prediction module 46 may encode a current block using various intra-prediction modes, e.g., during separate encoding passes. For example, the intra-prediction module 46 may calculate rate-distortion values using a rate-distortion analysis for the various tested intra-prediction modes, and select the intra-prediction mode having the best rate-distortion characteristics among the tested modes. Rate-distortion analysis can determine an amount of distortion (or error) between an encoded block and an original, unencoded block that was encoded to produce the encoded block, as well as a bit rate (that is, a number of bits) used to produce the encoded block. The intra-prediction module 46 may calculate ratios from the distortions and rates for the various encoded blocks to determine which intra-prediction mode exhibits the best rate-distortion value for the block.

The intra-prediction module 46 can provide information indicative of the selected intra-prediction mode for the block to the entropy encoding module 56. The entropy encoding module 56 can encode the information indicating the selected intra-prediction mode. The video encoder 20 can include configuration data in the transmitted bitstream that can include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

As the prediction module 41 (and its other constituent modules) performs the various operations described above, the video encoder 20 may be bound by certain restrictions. The restrictions are observed by the prediction module 41 as it generates a predictive block using spatially correlated video data. For example, a neighboring CU used for spatial or temporal prediction may be unavailable if it is in another slice, in another tile, outside of the video frame being encoded, or in a not-yet encoded PU. The restrictions are avoided by implementing certain unavailability checks. The restrictions and associated unavailability checks are described below in connection with FIG. 4.

After the prediction module 41 generates the predictive block for the current video block via either inter-prediction or intra-prediction, the video encoder 20 forms a residual video block by subtracting the predictive block from the current video block. This process can result in pixel difference values. The pixel difference values form the residual data for the block, and can include both luma and chroma difference components. A summer 50, operably coupled to the prediction module 41 and the partitioning module 35, represents the component or components that can be configured to perform this subtraction operation.

The residual video data in the residual block may be included in one or more TUs and applied to a transform module 52 operably coupled to the summer 50. The transform module 52 can transform the residual video data into residual transform coefficients using a transform, such as a discrete cosine transform (DCT) or a conceptually similar transform. The transform module 52 can convert the residual video data from a pixel domain to a transform domain, such as a frequency domain. The prediction module 41 can provide the resulting intra- or inter-coded block to the summer 50 to generate residual block data. The resulting intra- or inter-coded block can further be provided a summer 62 to reconstruct the encoded block for use as a reference picture.

The video encoder 20 can also include a filter module 63 operably coupled to the summer 62. The filter module 63 can represent one or more loop filters such as a deblocking filter, an adaptive loop filter (ALF), and a sample adaptive offset (SAO) filter. Although filter module 63 is shown in FIG. 2 as being an in loop filter, in other configurations, the filter module 63 can be implemented as a post loop filter. The filter module 63 can provide reference pictures to the reference picture memory 64.

The transform module 52 can send the resulting transform coefficients to a quantization module 54. The quantization module 54 can quantize the transform coefficients to further reduce bit rate. The quantization process may reduce the bit depth associated with some or all of the coefficients. The degree of quantization may be modified by adjusting a quantization parameter. In some examples, the quantization module 54 can then perform a scan of the matrix including the quantized transform coefficients. In some embodiments, the entropy encoding module 56 may perform the scan.

Following quantization, the entropy encoding module 56 can entropy encode the quantized transform coefficients. For example, the entropy encoding module 56 may perform CAVLC, CABAC, SBAC, and/or PIPE, coding or another entropy encoding methodology or method. Following the entropy encoding by the entropy encoding module 56, the encoded bitstream can be transmitted to the video decoder 30. The bitstream can also be archived for later transmission or retrieval by the video decoder 30. The entropy encoding module 56 can also entropy encode the motion vectors and the other syntax elements for the current video slice being coded.

The video encoder 20 can also include an inverse quantization module 58 operably coupled to the entropy encoding module 56. An inverse transform module 60 can also be operably coupled to the inverse quantization module 58 and the summer 62. The inverse quantization module 58 and the inverse transform module 60 can apply inverse quantization and inverse transformation, respectively, to reconstruct the residual block in the pixel domain for later use as a reference block of the reference picture. The motion compensation module 44 can calculate a reference block by adding the residual block to a predictive block of one of the reference pictures within one of the reference picture lists. The motion compensation module 44 can also apply one or more of the interpolation filters to the reconstructed residual block to calculate sub-integer pixel values for use in motion estimation. The summer 62 can add the reconstructed residual block to the motion compensated prediction block produced by the motion compensation module 44 to produce a reference block for storage in the reference picture memory 64. The reference block can be used by the motion estimation module 42 and the motion compensation module 44 as a reference block to inter-predict a block in a subsequent video frame or picture.

Figure 3:
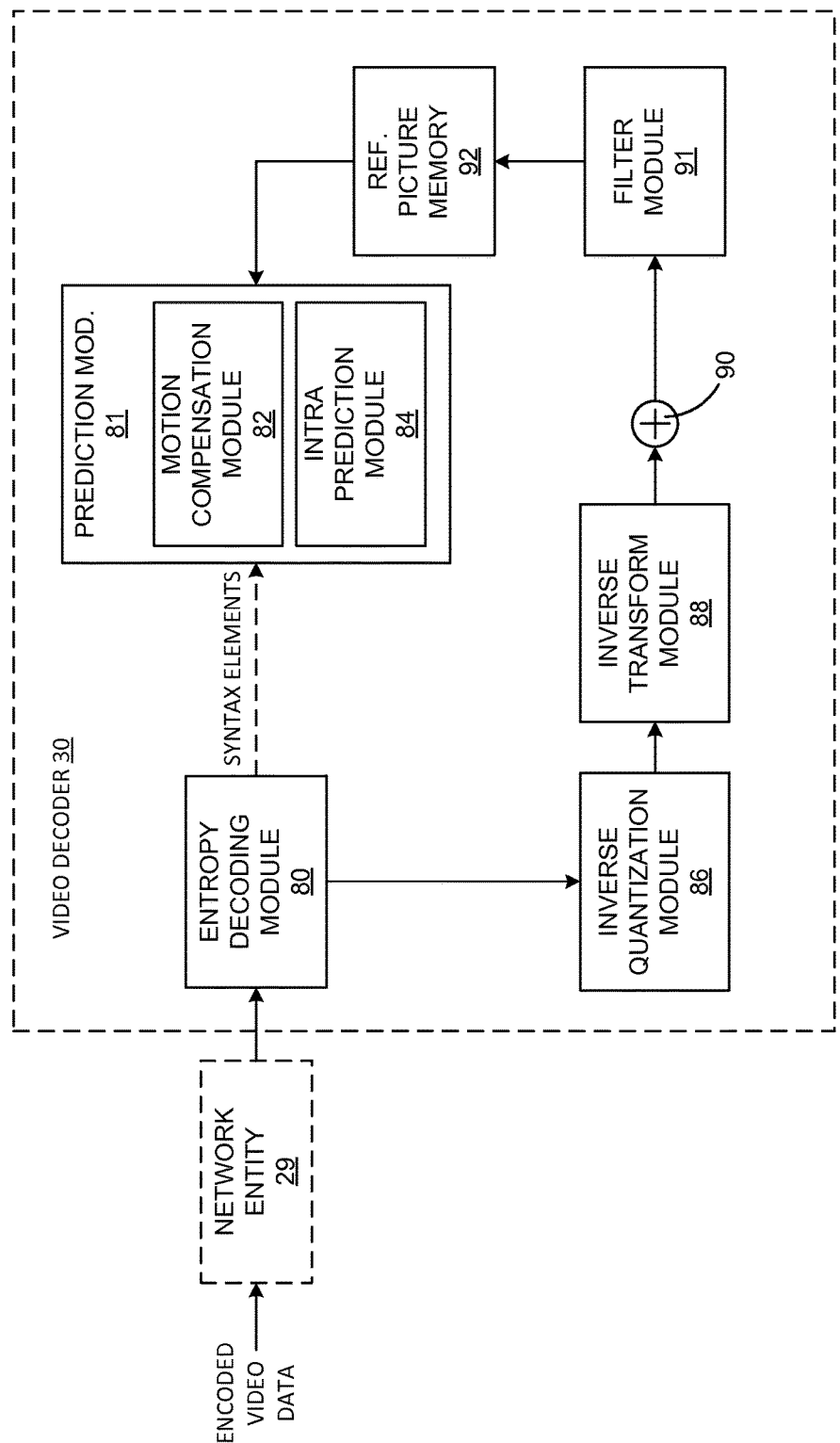
FIG. 3 is a block diagram of the video decoder of FIG. 1.

FIG. 3 is a functional block diagram of the video decoder of FIG. 1. The video decoder 30 can include an entropy decoding module 80, a prediction module 81, an inverse quantization module 86, an inverse transformation module 88, a summer 90, a filter module 91, and a reference picture memory 92. The prediction module 81 includes a motion compensation module 82 and an intra-prediction module 84. The video decoder 30 can, in some examples, perform a decoding pass generally reciprocal to the encoding pass described with respect to video encoder 20 from FIG. 2.

During the decoding process, the video decoder 30 receives an encoded video bitstream that represents video blocks of an encoded video slice and associated syntax elements from the video encoder 20. The video decoder 30 can receive the encoded video bitstream from a network entity 29. The network entity 29 may, for example, be a server, a video editor/splicer, or other such device configured to implement one or more of the methods described above. As described above, some of the methods described in this disclosure can be implemented by the network entity 29 prior to the network entity 29 transmitting the encoded video bitstream to video decoder 30. In some video decoding systems, the network entity 29 and the video decoder 30 can be parts of separate devices, while in other instances, the functionality described with respect to the network entity 29 can be performed by the same device that comprises the video decoder 30.

The entropy decoding module 80 of the video decoder 30 entropy decodes the bitstream to generate quantized coefficients, motion vectors, and other syntax elements. The entropy decoding module 80 forwards the motion vectors and other syntax elements to the prediction module 81. The video decoder 30 can receive the syntax elements at the video slice level and/or the video block level.

When the video slice is coded as an intra-coded (I) slice, the intra-prediction module 84 of the prediction module 81 can generate prediction data for a video block of the current video slice based on a signaled intra prediction mode and data from previously decoded blocks of the current frame or picture. When the video frame is coded as an inter-coded (i.e., B, P or GPB) slice, the motion compensation module 82 of the prediction module 81 produces predictive blocks for a video block of the current video slice based on the motion vectors and other syntax elements received from the entropy decoding module 80. The predictive blocks may be produced from one of the reference pictures within one of the reference picture lists. The video decoder 30 can construct the reference frame lists, List 0 and List 1, using default construction methods based on reference pictures stored in the reference picture memory 92.

The motion compensation module 82 determines prediction information for a video block of the current video slice by parsing the motion vectors and other syntax elements, and uses the prediction information to produce the predictive blocks for the current video block being decoded.

The motion compensation module 82 can also perform interpolation based on interpolation filters. The motion compensation module 82 can use interpolation filters as used by the video encoder 20 during encoding of the video blocks to calculate interpolated values for sub-integer pixels of reference blocks. In this case, the motion compensation module 82 can determine the interpolation filters used by the video encoder 20 from the received syntax elements and use the interpolation filters to produce predictive blocks.

The inverse quantization module 86 inverse quantizes, i.e., de-quantizes, the quantized transform coefficients provided in the bitstream and decoded by entropy decoding module 80. The inverse quantization process can include use of a quantization parameter calculated by video encoder 20 for each video block in the video slice to determine a degree of quantization and, likewise, a degree of inverse quantization that should be applied. Inverse transform module 88 applies an inverse transform, e.g., an inverse DCT, an inverse integer transform, or a conceptually similar inverse transform process, to the transform coefficients in order to produce residual blocks in the pixel domain.

After motion compensation module 82 generates the predictive block for the current video block based on the motion vectors and other syntax elements, video decoder 30 forms a decoded video block by summing the residual blocks from inverse transform module 88 with the corresponding predictive blocks generated by motion compensation module 82. Summer 90 represents the component or components that perform this summation operation. If desired, loop filters (either in the coding loop or after the coding loop) can also be used to smooth pixel transitions, or otherwise improve the video quality. Filter module 91 is intended to represent one or more loop filters such as a deblocking filter, an adaptive loop filter (ALF), and a sample adaptive offset (SAO) filter. Although the filter module 91 is shown in FIG. 3 as being an in loop filter, in other configurations, the filter module 91 can be implemented as a post loop filter. The decoded video blocks in a given frame or picture are then stored in the reference picture memory 92, which stores reference pictures used for subsequent motion compensation. The reference picture memory 92 also stores decoded video for later presentation on a display device, such as the display device 32 of FIG. 3.

Figure 4:
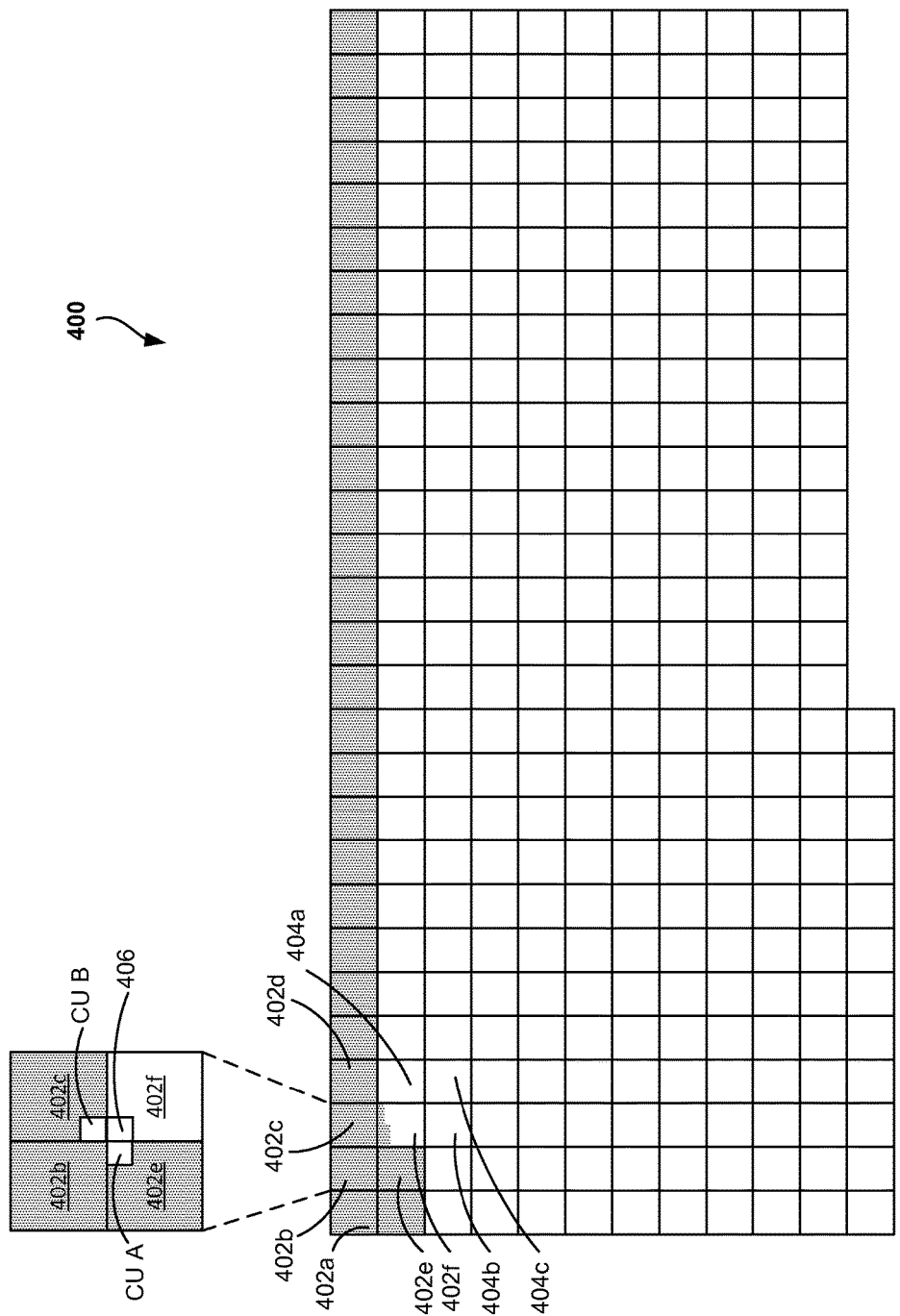
FIG. 4 is a graphical representation of a video data block.

FIG. 4 is a graphical representation of a video data block. A video data block 400 can represent a CTU, CU, or PU data structure for encoding video data. In some embodiments, the video data block 400 can be a portion of a picture, a video slice or tile, a treeblock or other portion of a larger video data block. The video data block 400 is shown as a series of squares, representing CTUs and/or PUs. The gray colored squares represent coded CTUs 402a-402e (collectively referred to herein after as coded CTUs 402). Not all of the coded CTUs 402 are labeled herein for brevity. A CTU 402f is currently being encoded, though it is not completely encoded, as shown by the partial gray color. Accordingly, the CTU 402f can also be referred to herein as the "current CTU 402f," indicating that it is the CTU being encoded. As used herein, the CTUs, CUs, and/or PUs may be referred to generically as data elements.

The white squares represent uncoded CTUs 404a-404c (collectively, uncoded CTUs 404). In some embodiments, the white blocks can also represent CTUs depending on the coding standard (e.g., HEVC), prediction mode, and the video data within the video data block 400. As described herein they may generally be referred to as uncoded CTUs 404. As the video encoder 20 encodes the video data contained in each of the uncoded CTUs 404, the coding proceeds from left to right, top to bottom, until the entire video data block 400 has been encoded. As shown, the video encoder 20 has processed the gray squares, representing the coded CTUs 402. The white squares represent uncoded CTUs 404 that have not yet been encoded.

The video encoder 20 can exploit neighboring video information to code the current video data. For example, as the video encoder 20 encodes the current CTU 402f, the video encoder 20 can reference the data encoded for the coded CTUs 402b, 402c, 402d, and 402e, because spatially connected information is often correlated. With some spatial prediction, current data for the video data block 400 can be represented as a difference from the reference picture, for example, with a vector. The more precise a prediction is, the more the resulting entropy can be reduced.

The coded CTUs 402b, 402c, 402d, and 402e can be generally referred to herein as neighboring CTUs, in reference to the current CTU 402f. In some embodiments, just as the current CTU 402f is the CTU 402 being encoded (or the next CTU 402 to be encoded) and references neighboring CTUs, each uncoded CTU 404 can have a similar encoding process for each constituent PU or CU. The inset of FIG. 4 shows a current CU 406 (within the current CTU 402f) referencing neighboring CUs, CU A and CU B. It should be noted that the current CTU 402f in FIG. 4 is not colored the same as the CTU 402f in the inset of FIG. 4. The partial gray color of the CTU 402f indicates that it is partially encoded. For purposes of the description and illustration of various restrictions described below, the current CTU 402f in the inset is not colored to indicate certain references made to neighboring CUs during the encoding process.

In some embodiments, the video encoder 20 is not able to reference any of the uncoded CUs/PUs (e.g., the uncoded CUs in the uncoded CTUs 404) below and/or to the right of the CTU 402f and not yet coded CUs/PUs in the CTU 402f because they have not yet been coded and otherwise "unavailable."

In HEVC, for example, there are certain restrictions to the use of spatial prediction, as noted above. For example, spatial prediction cannot be completed across the slice boundary or tile boundary. Additionally, the video encoder 20 cannot use an inter-coded CU in predictions for intra-mode coding.

In some embodiments such coding restrictions can result in inefficient encoding, because the video encoder 20 checks each restriction prior to coding a CU (e.g., CU in the CTU 402f). Multiple or successive unavailability checks due to the restrictions can add delays and slow the encoding process. Such delays may be especially detrimental to, for example, ultrafast encoders, such as for example, a 4K ultra-high definition (UHD) real-time encoder.

A neighboring CU (e.g., the coded CUs 402 or the uncoded CUs 404) can be unavailable to the video encoder 20 in a variety of circumstances. For example, if the neighboring CU A, CU B is 1) in another slice, 2) in another tile, 3) outside the current frame, 4) in different CTU row (e.g., the uncoded CTU 402c), or 5) in a not-yet-encoded CUs/PUs (e.g., of the current CTU 402f), such video data may not be available as a reference to the video encoder 20 for coding the CU (e.g., in the current CTU 402f).

For example, certain restrictions may require the following actions and present the associated default settings:

CABAC Context Derivation for Split Flag. The video encoder 20 can determine if two neighboring CUs (e.g., a CU A and a CU B) are available. The CU A and CU B can, for example, be the neighboring CUs within the CTU 402e and the CTU 402c, described in relation to encoding the current CU 406 within the CTU 402f. If the neighboring CU A (or CU B) is not available, the video encoder 20 can set the CU depth A (or B) to zero. The CABAC context is then derived from the CU depth of the current CU and the CU depth of CU A and CU B.

CABAC Context Derivation for Skip Flag. The video encoder 20 can determine if two neighboring CUs (the CU A and the CU B) are available. If one of the neighboring CU A (or CU B) is not available, the video encoder 20 can set the CU depth A (or B) to not-skip. The CABAC context can be derived based on whether CU A and CU B are set to SKIP mode.

Merge Candidate Derivation. A merge function indicates that a current PU has an identical motion vector to one of its neighboring PUs, and can therefore be merged together. The video encoder 20 can check if a neighboring PU is available. If the neighboring PU is not available, then no merge candidate will be found. If the neighboring PU is available, the video encoder 20 can determine if the neighboring PU is in inter-mode prediction. If the neighboring PU is not in inter-mode prediction, then no merge candidate is available. If the neighboring PU is in inter-mode prediction, the video encoder 20 can derive the merge candidate from the neighboring PU.

Motion Vector Predictor Derivation. The video encoder 20 can determine if a neighboring PU is available. If the neighboring PU is not available, then no merge candidate will be found. If the neighboring PU is available, the video encoder 20 can determine if the neighboring PU is in inter-mode prediction. If the neighboring PU is not in inter-mode prediction, no motion predictor will be found. If the neighboring PU is in inter-mode prediction, the motion predictor can be derived from the neighboring PU.

Intra Mode Predictor Derivation. The video encoder 20 can determine if a two neighboring PUs, PU A and PU B, are available. If the neighboring PU A (or B) is not available, the video encoder 20 can set the intra-prediction mode of the neighboring CU A (or B) to intra-DC prediction. The video encoder 20 can further determine if the neighboring PU A (or PU B) is intra-predicted. If the neighboring PU A (or B) is not intra-predicted, the video encoder 20 can set intra-prediction mode of the neighboring PU A (or PU B) to intra DC prediction. The video encoder 20 can also use the intra prediction mode of the neighboring PU A and PU B to predict the intra-prediction mode of the current PU.

The number and frequency of the unavailability checks can tax the system resources of the video encoder 20, increasing processing overhead and decreasing encoding efficiency. Therefore, inn some embodiments, it is desirable to avoid the foregoing checks in order to reduce overhead and processing time. Accordingly, certain default data can be inserted in the video data block 400 or referenced during coding to avoid such restrictions and repeated checks.

Figure 5:
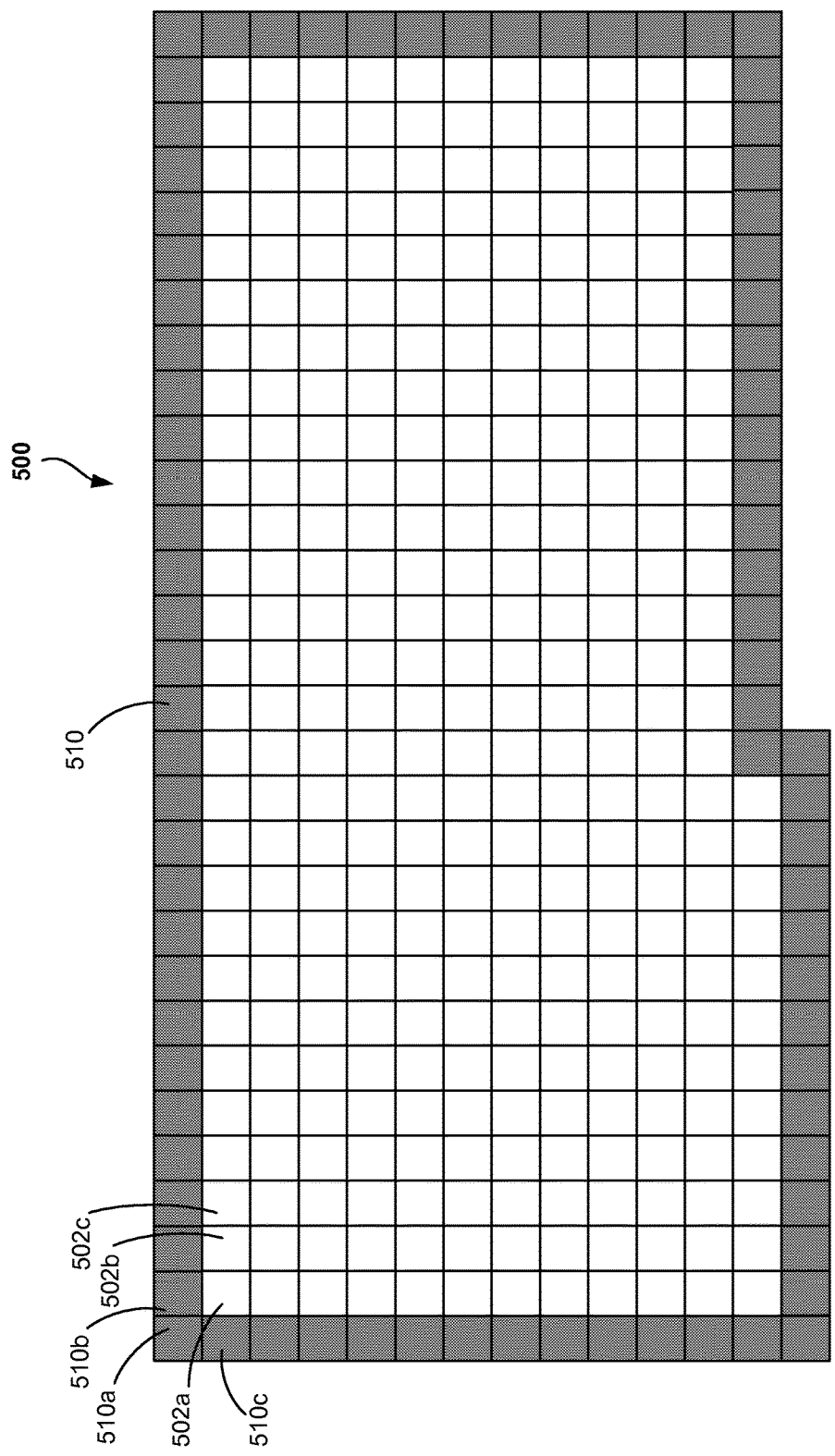
FIG. 5 is a graphical representation of a default data block using extended units.

FIG. 5 is a graphical representation of a data structure using extended default data. A data structure 500 can represent a CTU, CU, or PU data structure for encoding video data. For example, the video encoder 20 can use the data structure 500 to encode the video data block 400. The data structure 500 can include a portion of a picture, a video slice or tile, or a portion of a larger block of video data to be encoded, depicted as a plurality of CTUs 502 shown as white squares, representing video data or data elements to be encoded. In embodiments associated with HEVC, the white squares can also represent CUs or PUs. This is similar data to the video data block 400. The CTUs 502 can be labeled and described individually using letters identifiers (e.g., 502*a*, 502*b*, etc.). In some embodiments, the CTUs 502 can correspond to the CTUs 402 and the CTUs 404 (FIG. 4). In some other embodiments, the number and arrangement of the CTUs 502 can be defined by the number and arrangement of the CTUs of the video data block 400 (e.g., the coded CTUs 402 and the uncoded CTUs 404). In HEVC, for example, the CTUs 502 can also be CUs or PUs. For example, a CTU can include multiple CUs. Correspondingly, a CU can contain multiple PUs.

The data structure 500 can also have extended units 510 that increase the size of the data structure 500 by at least one PU in all directions. Conceptually, the extended units 510 represent data that can be disposed along the periphery of the video data to be encoded. Thus, the extended units 510 can be stored in memory with a spatial relationship to the CTUs 502 defining a periphery of the video data block to be encoded (e.g., the video data block 400). The extended units 510 can be labeled and described individually using letter identifiers (e.g., 510*a*, 510*b*, etc.). The extended units 510 are represented by the dark gray squares in FIG. 5.

The entire data structure 500 can be buffered or stored to memory (in, e.g., the storage device 34) and referenced during encoding of a first video block, such as for example, the video data block 400. The stored default data in the extended units 510 can be referenced as the slice or tile (e.g., the video data block 400) encoding starts. In some embodiments the storage device 34 is capable of storing all of the smallest PU information for the given data structure 500. In another embodiment, the encoder 20 may only buffer the default data in the extended units 510 in memory. In HEVC for example, data relating to every 4×4 pixel block (e.g., a smallest PU) can be stored or buffered in memory and referenced during encoding. In some embodiments, all of the PU information stored in the data structure 500 remains geometrically aligned with corresponding data in the associated slice or tile being encoded (e.g., the video data block 400), when stored in memory. For example, the data structure 500 can have the same number and arrangement of elements as the video data block 400 such that each element being coded in the video data block has a corresponding element in the data structure 500. Thus, as the video data block 400 is encoded using the data structure 500, the video encoder 20 can use the extended units 510*a*, 510*b*, 510*c* (among other neighboring PUs, CUs, and extended units 510) as spatial references when encoding the CTU 402*a*

(FIG. 4). This can lead to a reduction in the number of unavailability checks needed to encode, for example, the CTUs 404.

In some embodiments, the encoder 20 can therefore use the extended units 510 can to avoid or minimize the unavailability checks, discussed above. The video encoder 20 can apply the data from the extended units 510 to each PU on the border of the data structure 500 before the slice or tile (e.g., the data structure 500) coding starts. For example, as the video encoder 20 begins encoding the CTU 502*a* (e.g., the very first data block of the slice), the encoder 20 may need reference values. Accordingly, the video encoder 20 can use data related to extended units 510*a*, 510*b*, and 510*c* as reference values to encode the CTU 502*a*, without executing all of the checks described above.

As the video encoder 20 prepares to encode the data block 400, the video encoder 20 can apply the default data in the extended units 510, preempting at least a portion of the unavailability checks. In some embodiments, the video encoder 20 can set the following default values for the extended units 510:

1) CU depth is equal to zero
2) Prediction mode is set to intra-prediction
3) Intra-prediction mode is set to DC prediction The foregoing default values are indicated for HEVC implementation of the default data relating to the extended units 510. However, it should be noted that codecs requiring similar checks can not only implement the data from the extended units 510, but also the default values as noted.

In some embodiments, when the prediction mode of the current PU is decided, the video encoder 20 can update the default values accordingly. However, intra-prediction mode is only updated when the current PU is in intra-prediction mode; otherwise, intra-prediction mode remains at DC prediction.

The use of such default data in the extended units 510 can result in simplified checks, as the video encoder 20 can assume certain data based on the default values, minimizing the unavailability checks. As a result, the checks performed by the video encoder 20 can be simplified as follows:

CABAC Context Derivation for Split Flag. CABAC context is derived from the CU depth of the current CU and the CU depth of CU A and CU B.

CABAC Context Derivation for Skip Flag. CABAC context is derived based on whether CU A and CU B are set to SKIP mode.

Merge Candidate Derivation. The video encoder 20 can check if the neighboring PU is in inter-mode prediction. If the neighboring PU is not in inter-mode prediction, then no merge candidate is found. If the neighboring PU is in inter-mode prediction, then the merge candidate can be derived from the neighboring PU.

Motion Vector Predictor Derivation. The video encoder 20 can check if the neighboring PU is in inter-mode prediction. If the neighboring PU is not in inter-mode prediction, then no motion predictor is found. If the neighboring PU is in inter-mode prediction, motion predictor will be derived from the neighboring PU.

Intra-Mode Predictor Derivation. The encoder can use the intra-prediction mode of the neighboring PU A and PU B to predict the intra-prediction mode of the current PU.

In some embodiments, the buffer or memory size (e.g., the storage device 34) can be limited. Accordingly, smaller blocks of default data can be implemented to preserve memory use. In some embodiments, the video encoder 20 can reduce memory usage by not storing an entire slice or tile (e.g., the video data structure 500) but storing a smaller data structure, such as a single CTU in memory. The CTU can then be repeated during encoding, serving the same purpose as storing the entire data structure 500.

Figure 6A:
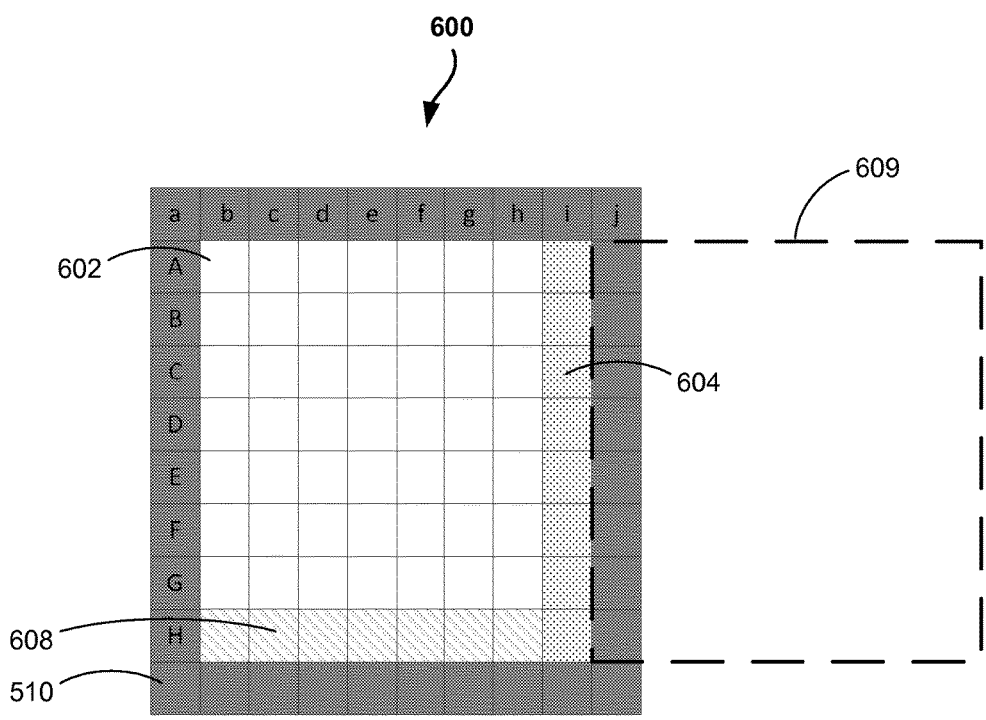
FIG. 6A is a graphical representation of a data structure used to code video data.

FIG. 6A is a graphical representation of a data structure used to encode video data. A data structure 600 has a portion of the PU shown in FIG. 5 depicted as a plurality of white squares, referred to herein as PUs 602. In some embodiments, the data structure 600 has a size defined as (M/N)×(M/N) elements, where the data structure 600 can be used to encode a CTU with a size M×M and a smallest PU size N×N. For example, the data structure 600 is shown where M=32 and N=4. The video encoder 20 can extend the data structure by one element, or extended unit 510 (colored gray), in every direction. Thus, in memory, the data structure 600 can be represented as 10×10 elements. This can include the 8×8 elements, or PUs 602, corresponding to for example, a CTU, in addition to the extended units 510, shown as gray squares. In some embodiments, the 8×8 block of PUs 602 can correspond to a single white block of FIG. 4 or FIG. 5 (e.g., the uncoded CTUs 404, 502).

The extended units 510 can be described as being positioned on the outside of the 8×8 PUs 602. Alternatively, the extended units 510 can be described as being disposed along the periphery of the 8×8 PUs 602. The 10×10 data structure 600 can then be referred to in terms of rows and columns, where the rows are arranged horizontally and the columns vertically. Accordingly, the data structure 600 has 10 rows and 10 columns.

In some embodiments, the video encoder 20 can save the data structure 600 in memory (e.g., the storage device 34), and subsequently update and reference the data structure 600 to set default values for uncoded PUs (e.g., the PUs 602, or neighboring PUs as encoding proceeds. In some embodiments, only the extended units 510 are buffered and updated as subsequent CTUs are encoded.

In some embodiments, the data structure 600 can represent a default data structure that the video encoder 20 can reference as new video blocks (e.g., CTUs) are encoded. Instead of buffering an entire slice as in the data structure 500, the video encoder 20 can buffer the data structure 600 that occupies a much smaller structure of 10×10 elements. As noted, the data structure 600 contains the data from an equivalent sized CTU, which is the base data unit for a slice or tile in HEVC.

Before the video encoder 20 encodes a slice or tile (e.g., the video data block 400), all of the data in the uncoded PUs (e.g., the white squares, or the PUs 602) can be set to a default indicated by the data structure 600. The blocks labeled with lowercase letters a-h along the top of the data structure 600 and the blocks labeled with uppercase letters A-H along the left side can represent data (e.g., the columns and rows) from the extended units 510 that are periodically updated in the data structure 600 as the slice or tile (e.g., the data structure 500) is encoded. In some embodiments, only a portion of the data structure 600 is buffered. For example, the extended units 510, a plurality of right-most PUs 604 (colored light gray), and a plurality of bottom-most PUs 608 (diagonally striped) can be buffered for later use in encoding, while data from the remaining white blocks (e.g., the PUs 602) can be discarded. The right-most PUs 604 and the bottom-most PUs 608 represent the PUs 602, or coded elements, at the far right and the bottom, respectively, of the CTU being coded.

As shown, a CTU 609 is represented by a dashed line indicating the relationship between successive CTUs in a coded slice (e.g., the data block 400). As the data structure 600 is updated with data from subsequently-encoded CTUs (e.g., the CTU 609), the right-most PUs 604 are stored in the data structure 600 and become the left-most extended units 510 (labeled A-H) of the data structure 600 referenced for encoding the CTU 609. This is described in more detail below.

Figure 6B:
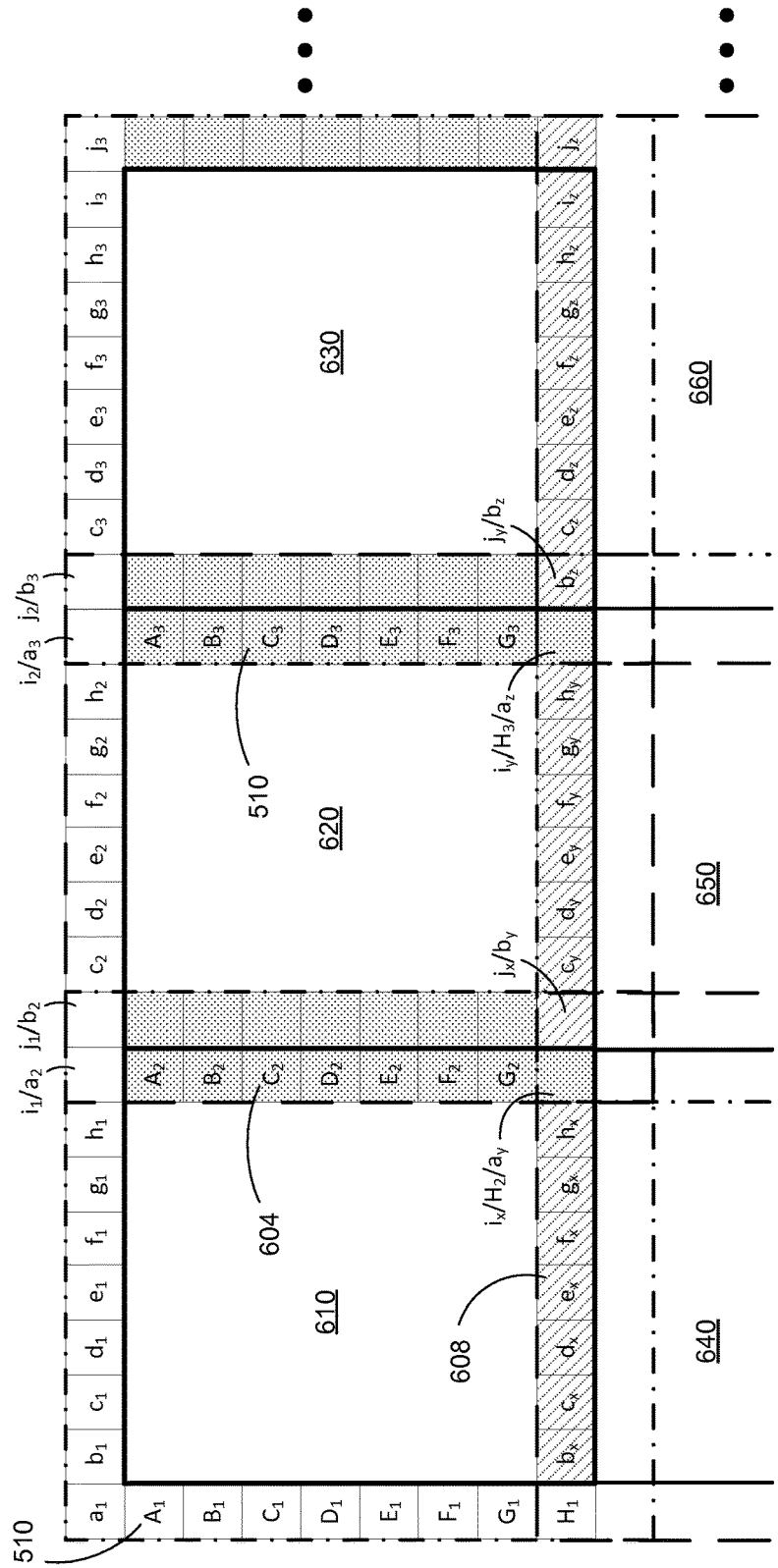
FIG. 6B is a graphical representation of a plurality of coding tree units (CTU) being encoded video data using the data structure of FIG. 6A.

FIG. 6B is a graphical representation of a plurality of CTUs being encoded video data using the data structure of FIG. 6A. Three CTUs 610, 620, 630, are shown surrounded by solid lines, indicating the data to be encoded. Dashed and dot-dashed lines indicate the relative position of the data in the data structure 600 as each of the CTUs 610, 620, 630 is encoded. Accordingly, the white space contained within the CTUs 610, 620, 630 can correspond to the 8×8 PUs of the data structure 600 or, in some embodiments, a single block of FIG. 4 and FIG. 5. In general, the data structure 600 referenced for encoding each of the CTUs 610, 620, 630 are each overlapped by two columns in the horizontal direction. The overlap is representative of how the video encoder 20 can reference the data buffered to the data structure 600 for encoding successive CTUs. Each of the CTUs 610, 620, 630 is surrounded by a 10×10 element dashed or dot-dashed box, encompassing the area that includes the extended units 510. The light gray elements at the right and the striped elements along the bottom of each of the CTUs 610, 620, 630, is representative of the right-most PUs 604 and the bottom-most PUs 608 (FIG. 6), respectively, that are used to update the extended units (e.g., A-H, a-j) of successive CTUs as they are encoded. Not all of the elements within FIG. 6B are labeled for figure clarity.

The CTU 610 is adjacent to the CTU 620 where the respective dashed and dot-dashed boxes overlap by a right-most column of PUs 604 in the data structure 600 for the CTU 610 and a left-most column of extended units 510 within the data structure 600 used to encode the CTU 620. The same is true for the CTU 620 and the CTU 630. In addition, a second row of CTUs, including portions of the data structure 600 referenced for three more CTUs 640, 650, 660, overlaps with the CTUs 610, 620, 620 by two rows. In particular, the data structure 600 for encoding the CTUs 640, 650, 660 are shown with alternating dashed and dot-dashed lines overlapped vertically by the bottom-most PUs 608 (diagonal stripes) and the bottom row of extended units.

Once the video encoder 20 encodes the CTU 610 according to the data structure 600, the right-most PUs 604 (shown in light gray) can be copied to the squares A-H of the data structure 600 in the buffer and used to encode the CTU 620. This replaces the values for $A_2$-$H_2$ for example, the extended units 510 in the data structure 600, now updated for use in encoding the next CTU 620. The extended units $A_2$-$H_2$ and $A_3$-$H_3$ are colored light gray to indicate that the data from the right-most CUs 604 (FIG. 6A) are used to update the data structure 600 for use in coding the subsequent CTUs 620, 630. The bottom-most CUs 608 (shown as diagonally striped squares), can then be copied to a line element buffer in memory (e.g., the storage device 34) which can store a number of elements with a size equal to the slice or tile width.

The data structure 600 can be continuously updated CTU by CTU until the last the last CTU in the first CTU row of the slice or tile (e.g, the video data block 400). Before starting a second CTU row with for example, the CTU 640, the values for A-H, a, of the data structure 600 and all data for the PUs 602 inside the CTU 640 can be initialized to a default value based on the data structure 600. Additionally, the data for $H_1$ can be set to default and the values for blocks $b_x$-$h_x$, $H_2$, $b_y$ (corresponding to a-j of FIG. 6A) can be updated with the data stored in the line buffer from the bottom blocks 608 prior to encoding the CTU 640. In some embodiments, for situations when a reference CTU in the vertical direction is not available, the relevant data elements can be initialized to a default value before updating the data using the data structure 600. For example, if PU $d_x$ is an intra-coded PU, the intra mode is reset to DC mode before updating. Then, the video encoder 20 can repeat the process on the second CTU row with the CTU 640, a CTU 650, and a CTU 660 and so on.

Figure 7:
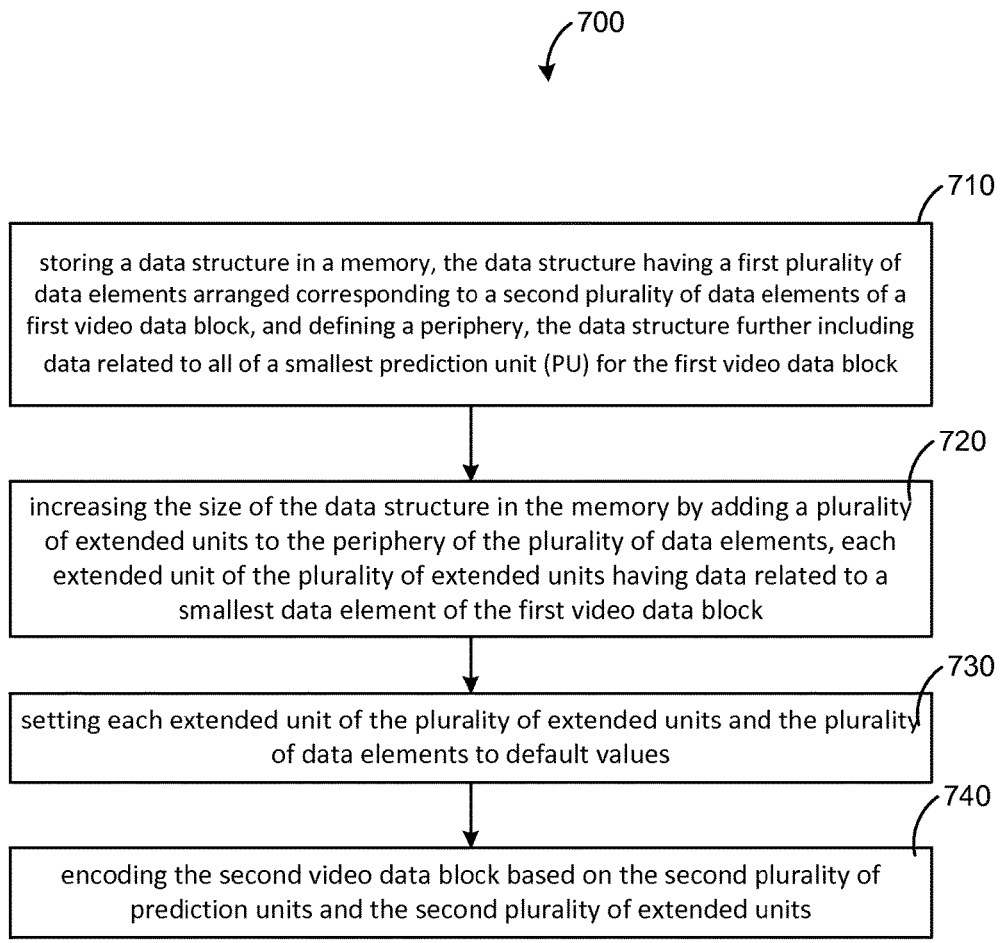
FIG. 7 is a flowchart of a method for encoding video data using the data structure of FIG. 5.

FIG. 7 is a flowchart of a method for encoding video data using the data structure of FIG. 5. A method 700 can be implemented using the video data block 400, the data structure 500, and the data structure 600 as described herein.

At block 710 the encoder can store a data structure in a memory. The data structure (e.g., the data structure 500) can have a plurality of data elements geometrically arranged to match a size of a first video data block such as the video data block 400. The data structure 500 can further include data related to all of a smallest prediction units (PU) for the first video data block 400. The data can include a smallest prediction unit for the video data block and relate to default values for a coding unit depth, a prediction mode, and an inter-prediction mode, among other characteristics.

At block 720, the encoder 20 can increase the size of the data structure in the storage device 34 by adding a plurality of extended units 510 along the periphery of the plurality of data elements (e.g, the video data block 400). Each of the extended units 510 can have data related to a smallest data element of the first video data block 400. For example, the video encoder 20 can add the extended units 510 to every side of video data block 400, forming the data structure 500.

At block 730 the video encoder 20 can set each extended unit 510 the plurality of data elements to default values. The extended units 510 can have data or values that are set to a default for the first data structure 500 (e.g. the slice or tile) for the video data to be encoded.

At block 740 the video encoder 20 can encode the video data block 400 using the data structure 500. The extended units 510 can serve as default references for encoding the CUs 404. The use of the data structure 500 can then reduce the unavailability checks.

Thus, the method 700 can be implemented by the video encoder 20 to reduce the amount of buffer memory (e.g., the storage device 34) required to encode successive video data blocks 400. Additionally, the method 700 can reduce the overhead related to the unavailability checks required of the video encoder 20.

Figure 8:
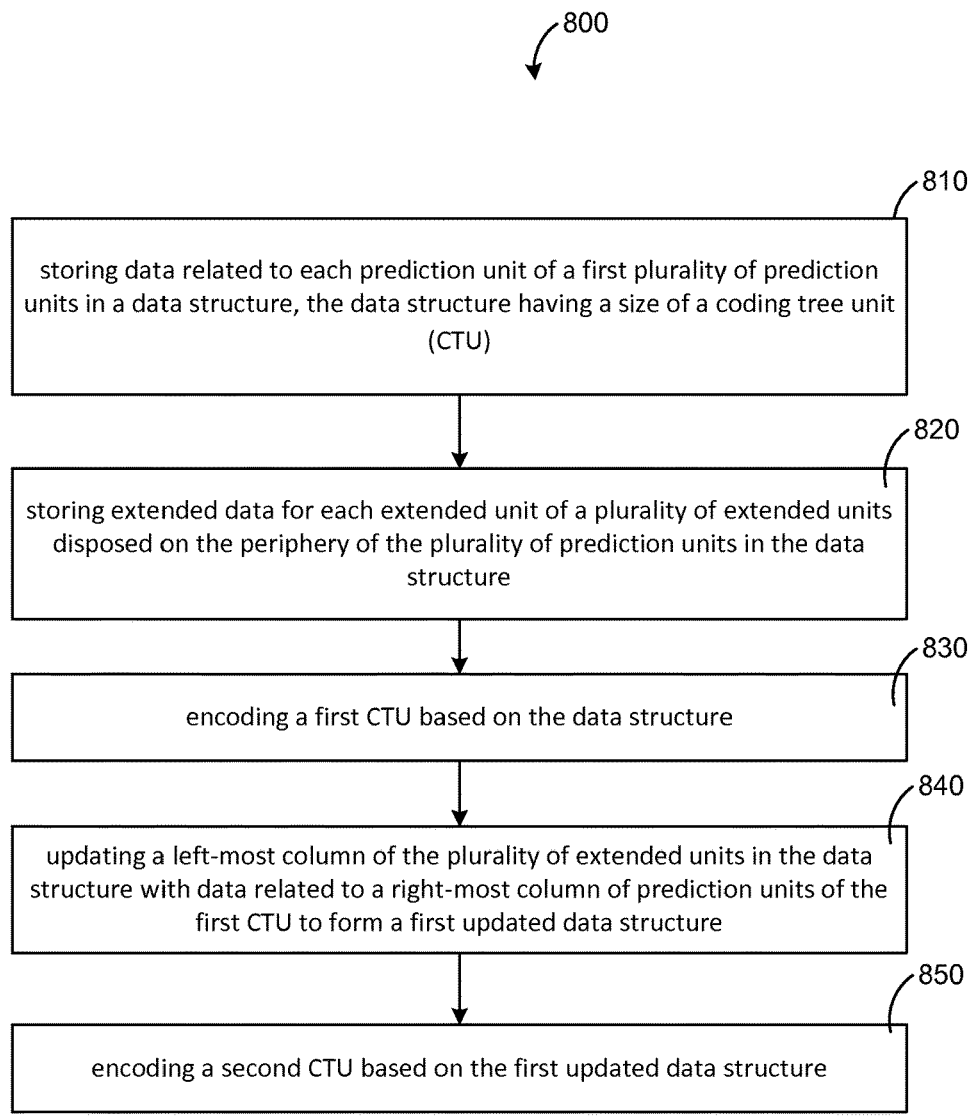
FIG. 8 is a flowchart of a method for encoding video data using the data structure of FIG. 6A.

FIG. 8 is a flowchart is a flowchart of a method for encoding video data using the data structure of FIG. 6A. A method 800 can be implemented using the video data block 400 and the data structure 600 as described herein.

At block 810, the video encoder 20 can store data related to each prediction unit of a first plurality of prediction units in a data structure (e.g., the data structure 600). The data structure 600 can have a size of a coding tree unit (CTU).

At block 820, the video encoder 20 can store extended data for each extended unit 510 of a plurality of extended units 510 disposed along the periphery of the plurality of prediction units in the data structure.

At block 830, the video encoder 20 can encode a first CTU (e.g, the CTU 610) based on the data structure 600.

At block 840, the video encoder 20 can update a left-most column (e.g, the extended units 510 labeled a, A-H) of the plurality of extended units 510 in the data structure with data related to a right-most column of coding units or prediction units (e.g., the right-most CUs 604) of the first CTU to form a first updated data structure 600.

At block 850, the video encoder 20 can encode a second CTU (e.g., the CTU 620) based on the first updated data structure 600.

Accordingly, the method 800 can reduce the amount of buffer memory (e.g., the storage device 34) required to encode successive CTUs 620, 630, 640, 650, 660, or one or more of the video data block 400. Additionally, the method 800 can reduce the overhead related to the unavailability checks required of the video encoder 20.

Information and signals disclosed herein can be represented using any of a variety of different technologies and methods. For example, data, instructions, commands, information, signals, bits, symbols, and chips that can be referenced throughout the above description can be represented by voltages, currents, electromagnetic waves, magnetic fields or particles, optical fields or particles, or any combination thereof.

The various illustrative logical blocks, modules, circuits, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The embodiments described herein may be implemented in hardware, software, firmware, or any combination thereof. Such embodiments may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the methods may be realized at least in part by a computer-readable data storage medium comprising program code including instructions that, when executed, performs one or more of the methods described above. The computer-readable data storage medium may form part of a computer program product, which can include packaging materials. The computer-readable medium can comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The methods additionally, or alternatively, can be realized at least in part by a computer-readable communication medium that carries or communicates program code in the form of instructions or data structures and that can be accessed, read, and/or executed by a computer, such as propagated signals or waves.

The program code can be executed by a processor, which can include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor can be configured to perform any of the methods and processes described in this disclosure. A general purpose processor can be a microprocessor; but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein can refer to any of the foregoing structure, any combination of the foregoing structure, or any other structure or apparatus suitable for implementation of the methods described herein. In addition, in some aspects, the functionality described herein can be provided within dedicated software modules or hardware modules configured for encoding and decoding, or incorporated in a combined video encoder-decoder (CODEC).

Although embodiments of the disclosure are described above for particular embodiment, many variations of the disclosure are possible. For example, the numbers of various components can be increased or decreased, modules and steps that determine a supply voltage can be modified to determine a frequency, another system parameter, or a combination of parameters. Additionally, features of the various embodiments can be combined in combinations that differ from those described above.

Those of skill will appreciate that the various illustrative blocks and modules described in connection with the embodiment disclosed herein can be implemented in various forms. Some blocks and modules have been described above generally in terms of their functionality. How such functionality is implemented depends upon the design constraints imposed on an overall system. Skilled persons can implement the described functionality in varying ways for each particular application, but such implementation decisions should not be interpreted as causing a departure from the scope of the disclosure. In addition, the grouping of functions within a module, block, or step is for ease of description. Specific functions or steps can be moved from one module or block or distributed across to modules or blocks without departing from the disclosure.

The above description of the disclosed embodiment is provided to enable any person skilled in the art to make or use the subject matter of the disclosure. Various modifications to these embodiments will be readily apparent to those skilled in the art, and the generic principles described herein can be applied to other embodiment without departing from the spirit or scope of the disclosure. Thus, it is to be understood that the description and drawings presented herein represent a presently preferred implementation of the disclosure and are therefore representative of the subject matter which is broadly contemplated by the present disclosure. It is further understood that the scope of the present disclosure fully encompasses other embodiment that may become obvious to those skilled in the art and that the scope of the present disclosure is accordingly limited by nothing other than the appended claims.

What is claimed is:

1. A method of coding video data, comprising:
storing a data structure in a local memory buffer by one or more processors, the data structure providing a reference for use during coding a picture, the data structure having first data elements arranged in a one-to-one manner with all data elements of a first portion of the picture to be coded, the first data elements including data related to all smallest prediction units (PUs) for the first portion of the picture and defining a periphery;
increasing, by the one or more processors, a size of the data structure in the local memory buffer comprising adding a plurality of extended units along the entire periphery of the first data elements, each extended unit of the plurality of extended units having data related to the PUs of the first portion of the picture;
setting each extended unit and the first data elements to default values;
generating a syntax element indicating coded video information related to the first portion of the picture based on the data structure; and
coding, by the one or more processors, a block based on the generated syntax element for the first portion of a picture.

2. The method of claim 1 further comprising performing an unavailability check on each data element of the second plurality of data elements based on the data structure.

3. The method of claim 2 further comprising determining a context adaptive binary arithmetic coding (CABAC) context for a split flag for a current CU of the first portion of a picture based on a CU depth of the current CU and a CU depth of at least one neighboring CU, the current CU being a data element of the first portion of a picture and the at least one neighboring CU being a data element of the first data elements.

4. The method of claim 2 further comprising determining a context adaptive binary arithmetic coding (CABAC) context for a skip flag for a current CU of the first portion of a picture based on whether at least one neighboring coding unit (CU) is set to skip mode, the current CU being a data element of the first portion of a picture and the at least one neighboring CU being a data element of the first data elements.

5. The method of claim 2 further comprising:
determining that a neighboring PU of a current PU of the first portion of a picture is set to inter-mode prediction; and
determining a merge candidate for the current PU based on the neighboring PU, the neighboring PU being a data element of the first plurality of data elements.

6. The method of claim 2 further comprising:
determining that a neighboring PU of a current PU of the first portion of a picture is set to inter-mode prediction; and
determining a motion predictor of the current PU based on the neighboring PU, the neighboring PU being a data element of the first plurality of data elements.

7. The method of claim 2 further comprising predicting an intra-prediction mode for a current PU of the first portion of a picture, based on a neighboring PU, the neighboring PU being a data element of the first plurality of data elements.

8. The method of claim 1 further comprising:
updating the plurality of extended units of the data structure based on a size and shape of a second portion of a picture to form an updated data structure; and
coding the second portion of a picture based on the updated data structure.

9. The method of claim 1, wherein coding the first portion of a picture based on the data structure comprises using the plurality of extended units as a reference for spatial prediction for coding the first portion of a picture.

10. The method of claim 1, wherein the smallest data element of the first portion of a picture comprises a prediction unit or a coding unit.

11. A device for coding video data, comprising:
a local memory buffer configured to store a data structure providing a reference for use during coding a picture, the data structure having first data elements arranged in a one-to-one manner with all data elements of to a first portion of the picture, the first data elements including data related to all smallest prediction units (PUs) for the first portion of the picture and defining a periphery; and
a processor operably coupled to the local memory buffer and configured to:
increase a size of the data structure in the local memory buffer, comprising adding a plurality of extended units along the entire periphery of the first data elements, each extended unit of the plurality of extended units having data related to the PUs of the first portion of a picture;
set each extended unit of the plurality of extended units and the first plurality of data elements to default values;
generate a syntax element indicating coded video information related to the first portion of a picture based on the data structure; and
code a block based on the generated syntax element for the first portion of a picture based on the data structure.

12. The device of claim 11, wherein the processor is further configured to perform an unavailability check on each data element of the second plurality of data elements based on the data structure.

13. The device of claim 11, wherein the processor further configured to complete at least one of the following:
determine a context adaptive binary arithmetic coding (CABAC) context for a split flag based on a current CU of the first portion of a picture and a CU depth of at least one neighboring CU, the current CU being a data element of the first portion of a picture and the at least one neighboring CU being a data element of the first data elements;
determine a CABAC context for a skip flag for the current CU of the first portion of a picture based on whether the at least one neighboring CU is set to skip mode;
determine that a neighboring PU of a current PU of the first portion of a picture is set to inter-mode prediction, and determining a merge candidate for the current PU based on the neighboring PU, the neighboring PU being a data element of the first data elements;
determine that the neighboring PU of the current PU is set to inter-mode prediction, and determining a motion predictor of the current PU based on the neighboring PU; and
predict an intra-prediction mode for the current PU of the first portion of a picture based on the neighboring PU.

14. The device of claim 11, wherein the processor is further configured to:
update the plurality of extended units of the data structure based on a size and shape of a second portion of a picture to form an updated data structure; and
code the second portion of a picture based on the updated data structure.

15. The device of claim 11, wherein the processor is further configured to reference the plurality of extended units for spatial prediction to code the first portion of a picture.

16. The device of claim 11, wherein the processor is further configured to set the default values to:
coding unit depth is equal to zero;
prediction mode is set to intra-prediction; and
intra-prediction mode is set to DC prediction.

17. The device of claim 11, wherein the smallest data element of the first portion of a picture comprises a prediction unit or a coding unit.

18. The device of claim 11, wherein the first portion of a picture comprises a slice or a tile.

19. A method of coding video data in a portion of a picture, comprising:
storing, by one or more processors, data related to each prediction unit (PU) of a first plurality of PUs in a data structure in a local memory buffer coupled to the processor, the data structure having a size of a coding tree unit (CTU) in a picture to be coded;
storing, by the one or more processors, extended data for each extended unit of a plurality of extended units disposed along the entire periphery of the first plurality of PUs in the data structure;
generating a first syntax element indicating coded video information related to a first CTU based on the data structure;
coding, by the one or more processors, a first block based on the first syntax element;
updating a left-most column of the plurality of extended units in the data structure with data related to a right-most column of PUs of the first CTU to form a first updated data structure;
generating, by the one or more processors, a second syntax element indicating coded video information related to a second CTU based on the first updated data structure; and
coding, by the one or more processors, a second block based on the second syntax element.

20. The method of claim 19, further comprising:
storing data related to a bottom-most row of PUs of the first CTU in an element line buffer, the element line buffer configured to store data related to a second plurality of PUs equal to a width of a portion of a picture;
storing data related to a bottom-most row of PUs of the second CTU in the element line buffer;
after coding a first row of CTUs in the portion of a picture, updating the left-most column of the plurality of extended units in the data structure and the first plurality of PUs in the data structure with default values, the first row of CTUs including the first CTU and the second CTU;
updating a top-most row of the plurality of extended units in the first updated data structure with data from the element line buffer to form a second updated data structure; and
coding a third CTU on a second row of CTUs based on the second updated data structure.

21. The method of claim 19, wherein coding the first CTU based on the data structure comprises using the plurality of extended units as a reference for spatial prediction for coding the first CTU.

22. The method of claim 19, wherein each PU of the first plurality of PUs includes a smallest PU for the first CTU, the data related to each PU of the first plurality of PUs comprising at least a coding unit depth, a prediction mode, and an inter-prediction mode.

23. The method of claim 19, wherein each extended unit of the plurality of extended units is set to have default values, the default values comprising:
coding unit depth is equal to zero;
prediction mode is set to intra-prediction; and
intra-prediction mode is set to DC prediction.

24. The method of claim 19 further comprising performing an unavailability check on each coding unit (CU) of a plurality of CUs of the CTU based on the data structure.

25. The method of claim 24 further comprising determining a context adaptive binary arithmetic coding (CABAC) context for a split flag for a current CU of the first CTU based on a CU depth of the current CU and a CU depth of at least one neighboring PU of the data structure, the current CU being a CU of the plurality of CUs and the at least one neighboring PU being a PU of the first plurality of PUs.

26. The method of claim 24 further comprising determining a context adaptive binary arithmetic coding (CABAC) context for a skip flag for a current CU of the CTU based on whether at least one neighboring PU is set to skip mode, the current CU being a being a CU of the plurality of CUs and the at least one neighboring PU being a PU of the first plurality of PUs.

27. The method of claim 24 further comprising:
  determining that a neighboring PU of a current CU of the first CTU is set to inter-mode prediction; and
  determining a merge candidate for the current CU based on the neighboring PU, the neighboring PU being a PU of the first plurality of PUs.

28. The method of claim 24 further comprising:
  determining that a neighboring PU of a current PU of the first CTU is set to inter-mode prediction; and
  determining a motion predictor of the current PU based on the neighboring PU, the neighboring PU being a PU of the first plurality of PUs.

29. The method of claim 24 further comprising predicting an intra-prediction mode for a current PU of the first CTU, based on a neighboring PU, the neighboring PU being a PU of the first plurality of PUs.

30. A device for coding video data, comprising:
  a local memory buffer configured to
    store a data structure, the data structure having data related to each prediction unit (PU) of a first plurality of PUs, the data structure further having a size of a coding tree unit (CTU) in a picture to be coded, and
    store extended data for each extended unit of a plurality of extended units disposed along the entire periphery of the first plurality of PUs in the data structure; and
  a processor operably coupled to the local memory buffer and configured to
    generate a first syntax element indicating coded video information related to a first CTU based on the data structure,
    code a first block based on the first syntax element,
    update a left-most column of the plurality of extended units in the data structure with data related to a right-most column of PUs of the first CTU to form a first updated data structure,
    generating a second syntax element indicating coded video information related to a second CTU based on the first updated data structure; and
    code a second block based on the second syntax element.

31. The device of claim 30, wherein the processor is further configured to:
  store data related to a bottom-most row of PUs of the first CTU in an element line buffer, the element line buffer configured to store data related to a second plurality of PUs equal to a portion of a picture width;
  store data related to a bottom-most row of PUs of the second CTU in the element line buffer; and
  after coding a first row of CTUs in the portion of a picture, update the left-most column of the plurality of extended units in the data structure and the first plurality of PUs in the data structure with default values, the first row of CTUs including the first CTU and the second CTU;
  update a top-most row of the plurality of extended units in the first updated data structure with data from the element line buffer to form a second updated data structure; and
  code a third CTU on a second row of CTUs based on the second updated data structure.

32. The device of claim 30, wherein the processor further configured to complete at least one of the following:
  determine a context adaptive binary arithmetic coding (CABAC) context for a split flag for a current CU of the first CTU based on a CU depth of the current CU and a CU depth of at least one neighboring PU of the first plurality of PUs;
  determine a CABAC context for a skip flag for the current CU of the first CTU based on
  whether the at least one neighboring PU is set to skip mode;
  determine that a neighboring PU of a current CU of the first CTU is set to inter-mode prediction, and determine a merge candidate for the current CU based on the neighboring PU, the neighboring PU being a PU of the first plurality of PUs;
  determine that the neighboring PU of a current PU is set to inter-mode prediction, and determining a motion predictor of the current PU based on the neighboring PU; and
  predict an intra-prediction mode for the current PU of the first CTU based on the neighboring PU.

33. The device of claim 30, wherein the processor is further configured to code the first CTU using the data structure as a reference for spatial prediction.

34. The device of claim 30, wherein each PU of the first plurality of PUs includes a smallest PU for the first CTU, the data comprising at least a coding unit depth, a prediction mode, and an inter-prediction mode.

* * * * *